United States Patent [19]
Barnebey

[11] 3,773,077
[45] Nov. 20, 1973

[54] FLUID FLOW CONTROL VALVES
[75] Inventor: Herbert L. Barnebey, Columbus, Ohio
[73] Assignee: Barnebey-Cheney Co., Columbus, Ohio
[22] Filed: Jan. 17, 1972
[21] Appl. No.: 218,114

[52] U.S. Cl................... 137/625.28, 251/DIG. 2
[51] Int. Cl............................................ F16k 13/00
[58] Field of Search........................... 251/DIG. 2; 137/625.28

[56] References Cited
UNITED STATES PATENTS
| | | | |
|---|---|---|---|
| 1,138,994 | 5/1915 | Steele | 251/DIG. 2 |
| 2,349,368 | 5/1944 | Myers | 137/625.28 |
| 2,180,173 | 11/1939 | Share | 251/DIG. 2 |
| 3,410,311 | 11/1968 | Burdock | 137/625.28 |

Primary Examiner—Arnold Rosenthal
Attorney—Wm. Henry Venable

[57] ABSTRACT

This disclosure relates to valves and valving systems for controlling the flow of fluids, particularly vapors and gases, through ports of relatively large area with relatively low pressure drops. The type of valve disclosed I call a "curtain valve;" it is comprised of an impervious flexible sheet (the curtain) movably installed to cover and uncover an opening or port on the upstream side so that the curtain seals around the edges of the port under the pressure differential across the port. To prevent deflection of the central part of the flexible sheet through the port opening a grid coextensive in area with the port opening may be provided on the downstream side, the bars of the grid being sufficient in number and spacing to support the flexible sheet or curtain which covers (or throttles) the port area. This disclosure includes such valving in a system of an array of several ports, the particular example selected to illustrate the invention being valving for controlling the flow of fluids in a typical adsorption system with three adsorbers.

3 Claims, 20 Drawing Figures

Patented Nov. 20, 1973

Patented Nov. 20, 1973

Patented Nov. 20, 1973  3,773,077

FLUID FLOW CONTROL VALVES

SUMMARY OF THE INVENTION

My invention relates to valves and valving systems for controlling relatively low pressure, large volume fluid flow. In the embodiments particularly illustrated and described below, the fluids are vapors or gases but the type of valving disclosed can be adapted to control liquid flows also and the term "fluid" as used herein has its usual meaning, referring to vapors, gases and liquids. The valve of this invention has the advantage of requiring relatively small space for installation, and simplicity in operation for valving either single or multiple ports, as compared, for example, to gate valves typical of the prior art. I call it a "curtain valve;" in brief, it is comprised of a flexible impervious sheet (the "curtain") movably installed to cover and uncover, or to throttle, a single port or various members of an array of ports, upstream of the port in the direction of fluid flow, so as to seal around the edges of the ports under the pressure differential between the upstream and downstream sides thereof. To prevent deflection of the central portion of the impervious sheet through the ports, a grid coextensive in area with the port may be provided in the downsteam side of the impervious sheet, the bars of the grid being sufficient in number and spacing to support the flexible sheet or curtain which covers or throttles the port area. When thus supported by a grid, the impervious flexible sheet or curtain may be made of relatively thin and light material, although the port which it covers has a very large area.

CROSS REFERENCE TO RELATED PATENT APPLICATIONS

Figure 1:
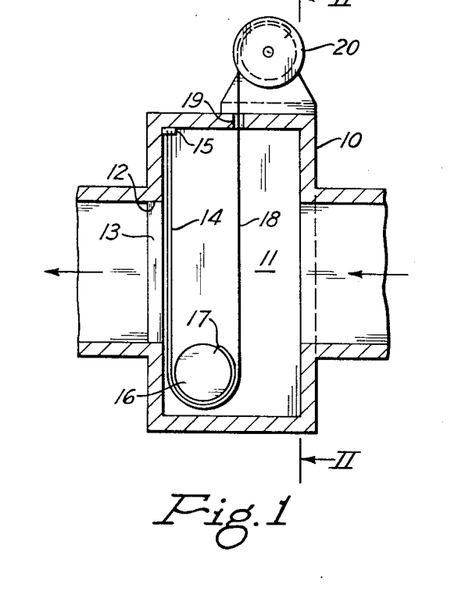
Figure 2:
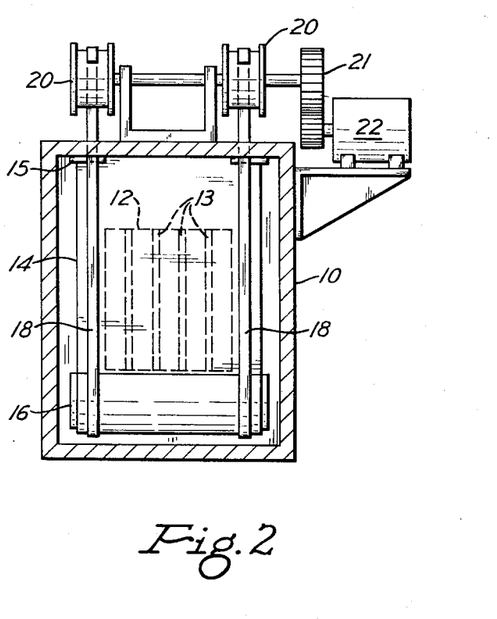

The claims in this application have been restricted to the species illustrated in FIGS. 1 and 2; for other species disclosed reference is made to my divisional and continuation applications Ser. No. 348,113 filed Apr. 5, 1973, Ser. No. 351,290 filed Apr. 16, 1973 and Ser. No. 357,714 filed May 7, 1973.

BRIEF DESCRIPTION OF DRAWINGS

The annexed drawings illustrate a variety of embodiments of my invention.

FIGS. 1 through 4 are sectional views of a single, substantially vertical, port covered by a suspended type of curtain. FIGS. 1 and 3 are longitudinal sections through two embodiments of this construction and FIGS. 2 and 4 are transverse sections at the planes II—II and IV—IV indicated, respectively, in FIGS. 1 and 3.

FIGS. 7 through 10 illustrate what I call a "roll-around" curtain valve.

FIGS. 11 and 12 illustrate another embodiment of a "roll-around" type of curtain valve in which the outlet ports are on the surface of a cylindrical duct. These figures are both sectional views, FIG. 11 being a transverse section at the zone XI—XI indicated in FIG. 12 while

FIGS. 14 through 20 illustrate a four duct, 12-port valve array chamber for a system such as shown in FIG. 13, using curtain type valves of my invention.

DETAILED DESCRIPTION

Referring first to FIGS. 1 and 2 which illustrate a simple embodiment of my invention, the valve is comprised of a housing 10 having a chamber 11 on the downstream side of which is an outlet port 12. A series of grid bars 13 flush with the upstream side of the outlet port 12 is provided. The grid bars in FIGS. 1 and 2 are shown extending from end to end of said opening but they may extend from side to side or, if preferred, such bars 13 may extend both lengthwise and transversely across said opening in the form of a grating. A flexible sheet 14 of area somewhat greater than that of the outlet port 12 is supported from the housing 10 at connection 15, somewhat above the upper side of the port opening 12. The other end of said flexible sheet is attached to a cylindrical roller 16, this connection being indicated at 17 on the drawings. Also connected to the housing 11 at connection 15 I show a pair of tapes 18 which pass 180° around the roller 16 and the sheet 14 and thence upwardly through slots 19 in the wall of housing 10 where they are attached to wind-up reels 20, driven through gears 21 by a motor 22. Thus by rotating the reels 20 to wind up the tapes 18, the roller 16 is raised from the bottom position shown in FIGS. 1 and 2, rotating as it is thus raised to wind up the curtain 14 and uncover the opening 12 to any desired extent.

When the port 12 is covered, or partially covered, by the sheet 14 the fluid pressure in the upstream side presses the impervious flexible sheet against the sides of the opening 12 and the grid bars 13. The sheet being thin and flexible, such pressure substantially seals the opening against fluid flow when closed.

Figure 3:
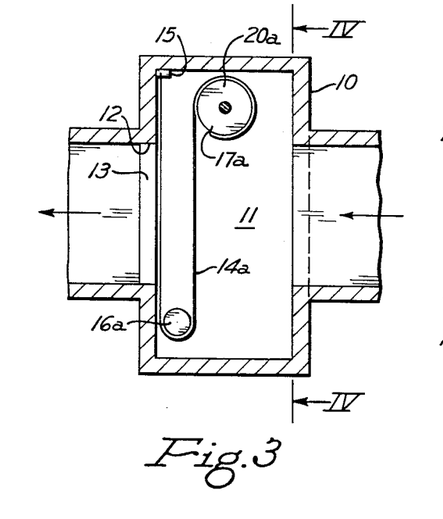
Figure 4:
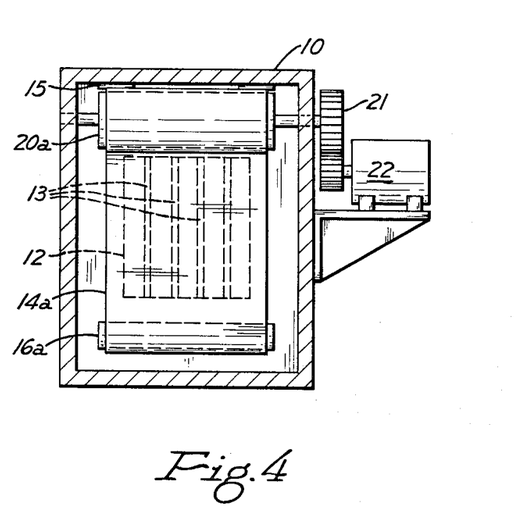

FIGS. 3 and 4 illustrate a valve similar to that shown in FIGS. 1 and 2, in which the corresponding elements are identified with the same reference numerals. However, in the embodiment of FIGS. 3 and 4 the reel 20a is disposed within the housing chamber 11 and the connection of the sheet 14a is made thereto, indicated at 17a in the figures, the sheet 14a passing 180° around the roller 16a to the reel 20a. That part of sheet 14a extending between the roller 16a and reel 20a when the valve is closed serves no function other than a wind-up reel connection and it may, if the curtain material be unduly expensive, be replaced by two or more tapes attached to the end of the curtain at the bottom and to reel 20a at the top. Hence as used herein, the term "connected to a reel" as applied to connection of the flexible sheet for covering the port opening, comprehends either mediate (as by tapes) or immediate (as direct) connection.

Figure 5:
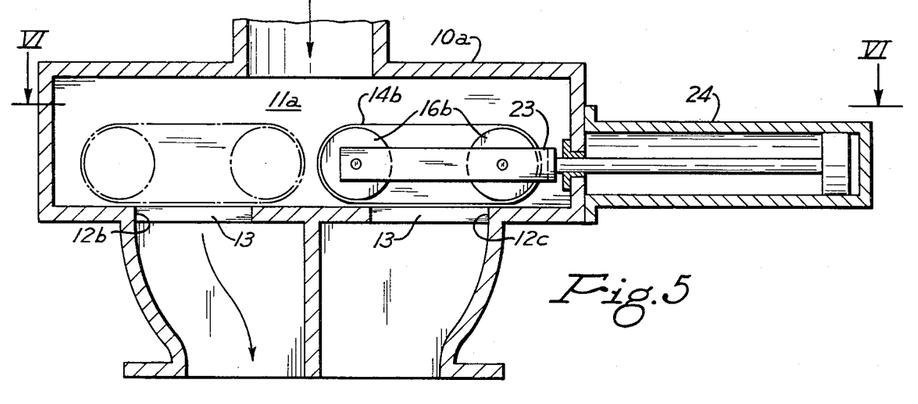
FIG. 5 is a transverse section through a valve having two substantially horizontal ports selectively closed by a rolling type curtain.
Figure 6:
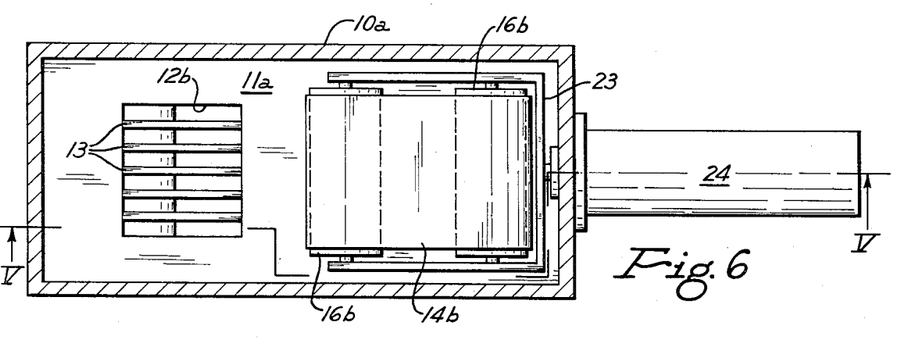
FIG. 6 is a horizontal section at the plane VI—VI indicated in FIG. 5.

The valves illustrated in FIGS. 1 through 4 are shown having only one outlet port (i.e., they illustrate a one-way type of valve). FIGS. 5 and 6 illustrate an embodiment having two selectable outlet ports (i.e., a two-way valve). However, the same construction is obviously also applicable to one-way valves, in which case one of the outlet ports (12b or 12c would be omitted, or to valves with more than two outlet ports.

The valve illustrated in FIGS. 5 and 6 is characteristic of what may be called a "rolling curtain" type of valve construction. In the particular embodiment shown, the housing 10a encloses a chamber 11a having outlet port openings 12b and 12c on one side thereof, each provided with grid bars 13 flush with the upstream faces of the port openings, as described in con-nection with FIGS. 1 through 4 above. For selectively covering either port opening 12b or 12c, I provide a "curtain" 14b in the form of a flexible impervious sheet looped around a pair of cylindrical rollers 16b, these rollers being at the ends of the loop of curtain 14b. The rollers are journalled in bearings in a yoke 23, spaced at a distance slightly greater than the width of the port openings 12b such that the lower reach of the curtain loop between the rollers fully covers the openings when the curtain and roller assembly is centered above said opening, resting on the edges of the port opening and the grid bars 13. Any convenient power means for moving the yoke 23 across the port openings, from one to the other, may be provided, a hydraulic cylinder 24 being shown in FIGS. 5 and 6 for this purpose. As the yoke is thus moved the rollers and loop of curtain roll across the plane of the openings, moving the curtains into position uncovering port opening 12c (shown closed in the drawing) and covering opening 12b.

The outlet ports in the embodiment illustrated by FIGS. 5 and 6 are shown in a straight line, such that the roller type of curtain has a rectilinear path for which a hydraulic cylinder is convenient power means. The roller type curtain valve is adaptable, however, to arrays of outlet ports disposed in other patterns, selected embodiments of which are illustrated in FIGS. 7 through 12 inclusive.

Figures 7, 8:
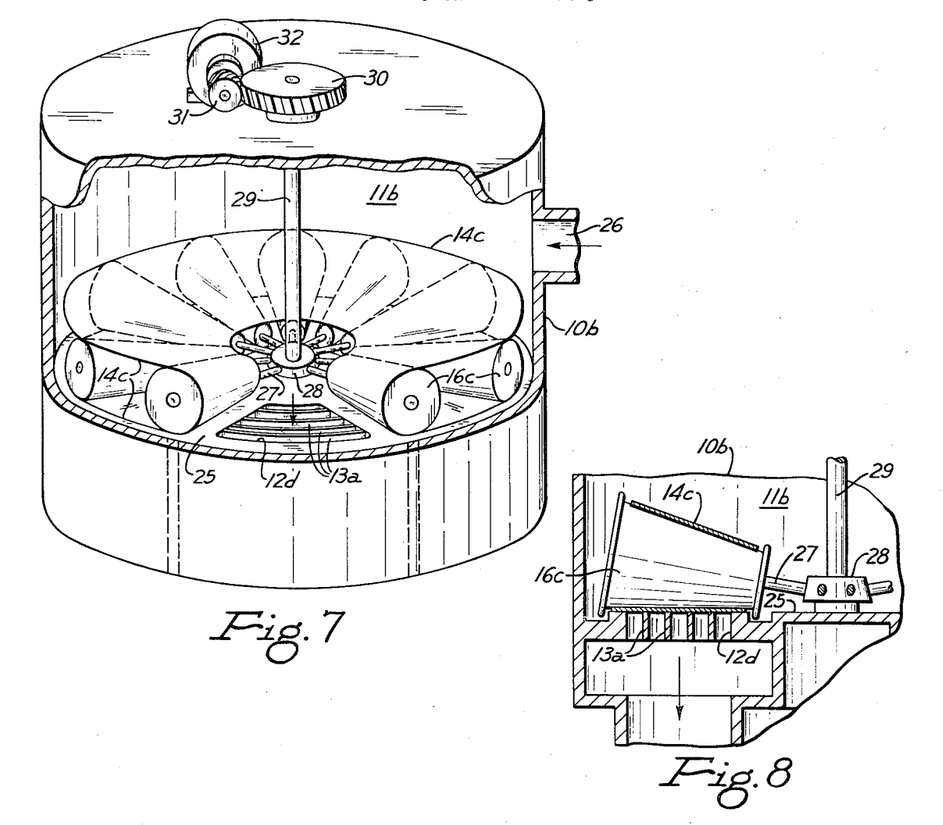
FIG. 7 is an isometric view of a typical multiple-port embodiment of this type with part of the housing broken away to reveal the internal construction.
FIG. 8 is a partial vertical sectional view illustrating a port covered by the roll-around curtain and with one roller and the drive therefor being shown.
Figure 9:
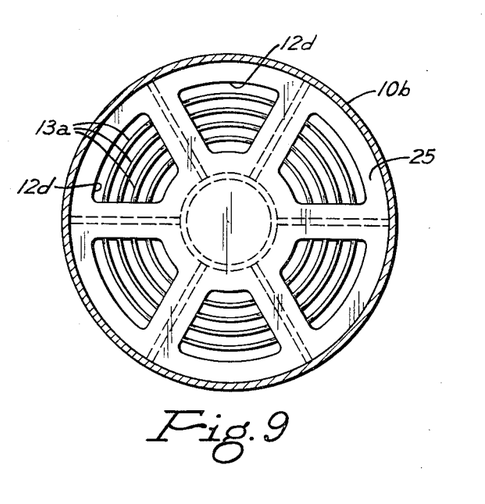
FIG. 9 is a horizontal section indicating the port arrangement.
Figure 10:
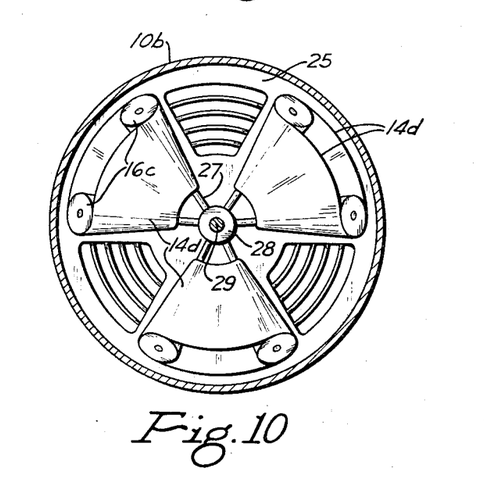
FIG. 10 is a horizontal section illustrating a variation of this type of valve adapted to selectively open and close several ports in a set.

The array of valve ports in the housing 10b illustrated in FIGS. 7 and 9 is in a circular series of port openings 12d in the floor 25 around the central axis of the cylindrical housing 10b. Each port opening has grid bars 13a, shown arcuate in shape, but otherwise the same as grid bars 13 previously described. The valve shown in these figures has six such port openings, each having ends parallel to radii of the circular floor 25 and arcuate sides. The number of outlet ports and their specific shape is not critical to the type of construction here disclosed, but the circular segment shape of port illustrated is preferable because it provides the maximum port opening area for this circular pattern. A fluid inlet 26 is shown above the floor, and the upper port of the valve chamber 11b is shown empty, but it is contemplated that fluid treating elements may be contained therein to filter or otherwise treat the fluid passing therethrough, such as, for example, the gas filters described in Hechenbleikner U.S. Patent No. 1,020,246 or my co-pending patent application Ser. No. 162,160 filed July 13, 1971. If fluid treatment within chamber 11b is not intended, the size of the housing would be reduced by lowering the roof to a short clearance distance above the roller curtain next to be described.

Resting on the floor 25 above the opening I provide a roller type curtain constructed to roll around the floor. For this purpose, the rollers 16c are frustrums of cones, the projected apexes of which are at the central vertical axis of the housing and the circular series of port openings 12d. A plurality of such rollers are provided, connected by radial axles 27 to a central spider 28 rotated by a vertical shaft 29 on the axis of the housing. The shaft 29 extends through the roof of the housing to a drive, for which a spiral helical gear 30 engaging a worm gear 31 driven by motor 32 are shown in FIG. 7. The impervious flexible sheet passing around the rollers may be a single continuous belt 14c (see FIG. 7) two of the conical rollers 16c being at the ends of the loop and the remaining rollers 16c serving to guide the belt and support the upper reach between the terminal rollers, which are spaced apart a distance somewhat wider than a port 12d, as shown in FIG. 7. This construction is used when the valve is intended to open one port only, all the others then being closed. If several ports are to be opened and closed together, a plurality of shorter belts 14d may be provided, each looped about a pair of conical rollers 16c, three such loops of belts being illustrated in FIG. 10 covering three of the six ports and opening the other three ports at any one time.

Figure 11:
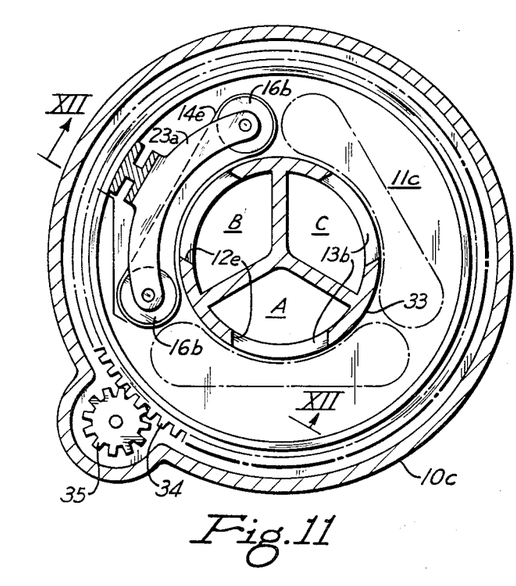
Figure 12:
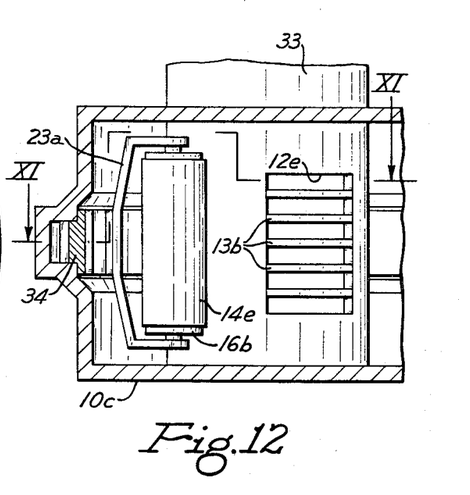
FIG. 12 is a partial longitudinal section at the zone XII—XII indicated in FIG. 11.

FIGS. 11 and 12 illustrate an embodiment of the roller-type curtain valve in which the array of port openings is in the surface of a cylindrical, multiple-passage conduit 33 axially disposed in a cylindrical valve housing 10c. Three such port openings 12e are shown, but any number may, of course, be provided, each opening 12e having a set of circumferential grid bars 13b flush with the outside cylindrical surface of the conduit 33. The valve chamber 11c is a circumferential passage between the housing 10c and conduit 33. The roller type curtain for closing or opening the ports is constructed of an endless belt of flexible sheet 14e passing around a pair of cylindrical rollers 16b. The inner reach of the loop in the belt 14e lies against the outside of the cylindrical conduit 33, the rollers 16b being closely adjacent to this conduit, and the rollers are rotatably assembled in a yoke-shaped frame 23a which is attached to a ring gear 34 mounted in a circumferential way formed in the wall of housing 10c. This ring gear is turned by a pinion 35, the drive shaft for which extends outside the housing to a driving gear and motor, not shown in the drawings. The rollers 16b in this embodiment, like the same rollers in FIGS. 5 and 6, are spaced apart a distance somewhat greater than the width of the outlet ports, so that when the yoke 23a is centered adjacent the center of any port 13b the inner reach of the loop of the belt 14e covers that port opening, supported at the edges by the sides of the port opening and in the central area by the arcuate grid bars 13b. In the example of this type of valve illustrated by FIGS. 11 and 12, the central fluid conduit 33 has three ducts respectively marked A, B and C and the construction illustrated provides for connecting any pair of these. With the roller curtain in the position shown, covering the opening between chamber 11c and duct B, the valve connects ducts A and C together. When the ring gear is rotated to shift the roller curtain to cover the port of duct C, the valve connects ducts A and B. If the port of duct A is covered, ducts B and C are connected. In most contemplated applications of this type of valve, one of the ducts, e.g., duct A, would be the fluid inlet duct and the other two would be selectable fluid outlet ducts, the normal operation of such valve being simply to close off duct B or duct C from the chamber 11c.

The versatility of my curtain valve construction for a complex array of valve ports in a unitary housing is evident from the following explanation of a system adapted to control the flow of gas and vapors in a three-adsorber installation, illustrated in FIGS. 13 through 20 inclusive.

Figures 13, 14:
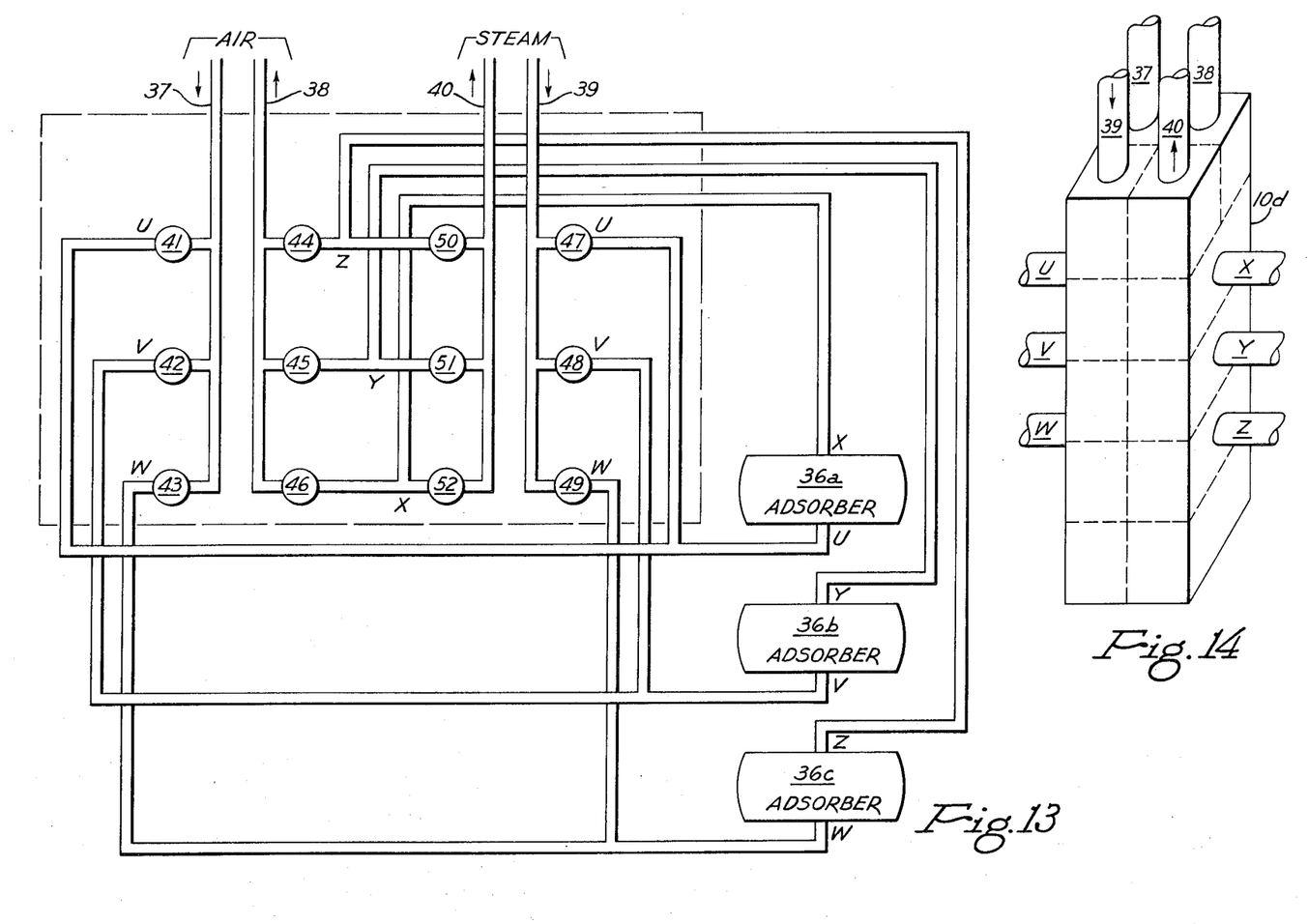
FIG. 13 is a flow diagram for gas flow through a typical three-adsorber system illustrating a 12-port valve requirement.
FIG. 14 is an isometric view of this valve housing from the outside.

The flow diagram for a typical adsorbtion installation is shown in FIG. 13. Such systems are well known to those skilled in the art, and the following description is mainly concerned with the valving for the desired flow sequence. In this example, the three adsorbers are provided to remove residual components, such as a solvent vapor, from a gas such as air. The adsorbers 36a, 36b and 36c are packed with a suitable adsorbent, such as granular activated carbon, through which the solvent laden air is passed until the adsorbent is saturated with the adsorbed vapor. Then low pressure steam is passed through each adsorber to remove the solvent and regenerate the adsorbent for a succeessive gas treatment. The regeneration of the adsorbers is performed in the respective adsorbers 36a, 36b and 36c in sequence at spaced time intervals, the time for regeneration being much shorter than the time for adsorbtion.

There are thus required four inlet and outlet ducts, two for the air flow and two for the flow of low pressure steam. In the pair for air flow the inlet duct is item 37 and the outlet duct is item 38 on the drawings; in the pair for low pressure steam the inlet duct is item 39 and the outlet duct is item 40. Air from the inlet duct 37 is channeled into the bottoms of adsorbers 37a, 37b or 37c by valves 41, 42 and 43 respectively, and after passing through the adsorbers the air discharged at the top is channeled to outlet duct 38 by valves 44, 45 and 46 respectively. Similarly, steam to regenerate the adsorbers is channeled from the steam inlet duct 39 into the bottoms of the adsorbers by valves 47, 48 and 49, respectively, and discharged from the tops of the adsorbers to outlet duct 40 through valves 50, 51 and 52.

The array of valves and ducts embodying my invention is assembled in a unitary valve housing 10d shown in FIG. 14. The ends of the conduits to the bottoms of the adsorbers 36a, 36b and 36c are marked with the letters U, V, and W, respectively, in the figures, and the ends of the conduits from the tops of the adsorbers are marked X, Y and Z to correlate FIGS. 14, 15, and 16 with FIG. 13.

Figure 15:
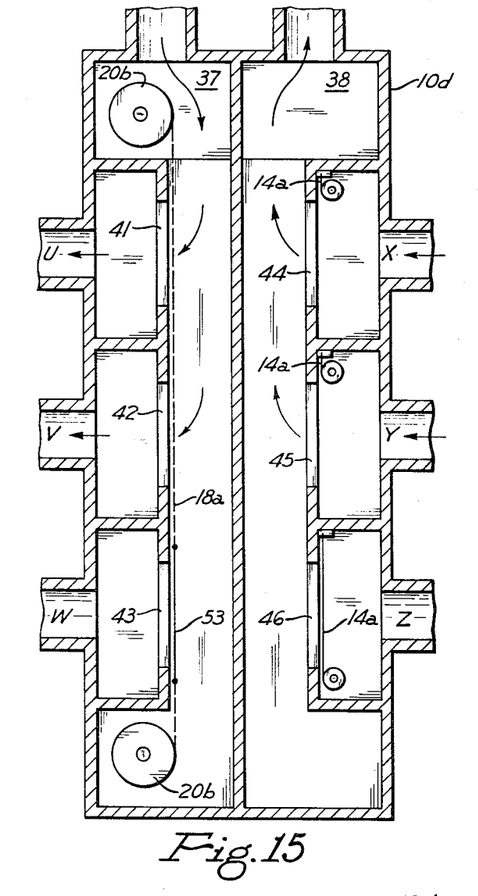
FIGS. 15 and 16 are longitudinal sections through the chamber of FIG. 14
Figure 16:
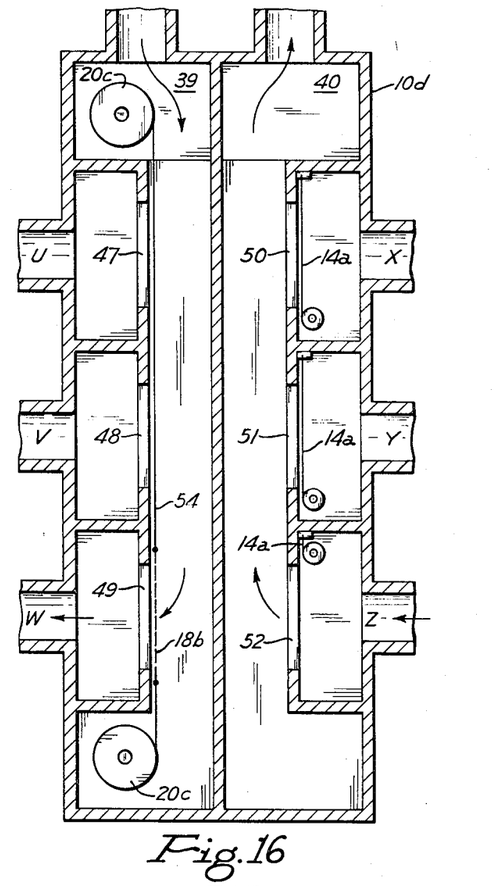
Figure 17:
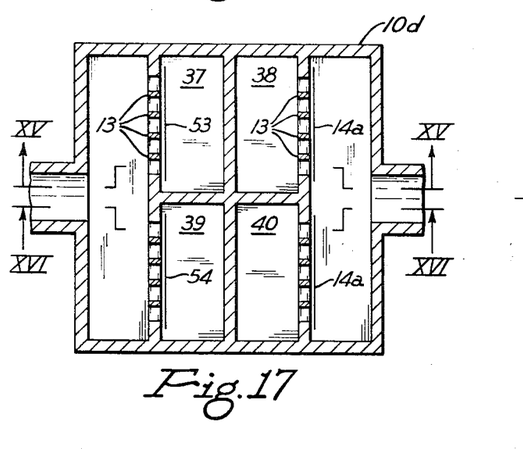
FIG. 17 is a typical transverse section through this housing.

The interior construction of the twelve valve array housing (seen externally in FIG. 14) is shown in FIGS. 15, 16, and 17, in which FIG. 15 is a longitudinal section through the air ducts 37 and 38, FIG. 16 is a longitudinal section through the steam ducts 39 and 40, and FIG. 17 is a typical transverse section through all four ducts at approximately the center of a set of four valve ports, the housing having three such sets to provide the 12 valve ports indicated in the flow diagram of FIG. 13. As shown in FIG. 14, the three air inlet valve openings are opened and closed selectively by a single movable curtain 53 but the three air outlet valves are opened and closed by three separate curtains 14a, each of the type shown in detail in FIGS. 3 and 4. Each of these openings is provided with curtain-supporting grid bars 13 and the curtains are movably mounted on the upstream sides of the openings, as previously explained.

Similarly, the three steam inlet valves shown in FIG. 16 are opened and closed by a single movable curtain 54 and the three steam outlet valves are separate curtain valves 14a.

The curtain 53 is a flexible sheet of width wider than the port openings and a length slightly longer than the length of the openings, attached to continuous tapes 18a wound on reels 20b adjacent opposite ends of the duct 37. By rotating these reels, the curtain 53 may be placed to cover any one of the three port openings or to uncover all three, as indicated more particularly in FIG. 20. The curtain 54 is a flexible sheet attached at each end to reels 20c located adjacent the ends of steam inlet duct 39 this sheet being discontinuous for a length approximating the length of a single port opening, and being connected across this length by spaced tapes 18b. By rotating the reels 20c all three ports may be covered by the flexible sheet 54, or any one may be selectively uncovered by placing the discontinuity in the sheet (bridged by the tapes 18b) adjacent any desired port opening. Thus the curtains in air inlet duct 37 and in steam inlet duct 39 exemplify a "reversal of parts" of the same construction; in one, the curtain is one port in length whereas in the other the opening through the curtain is one port in length. This construction may be characterized as the "sliding-curtain" type, in contrast with the previously described embodiments having curtains which are "rolled" to cover or uncover the valve openings. It was selected for disclosure in this particular 12-port array to illustrate an additional construction, and not because the rolling type was considered unadaptable to this array, and it is to be understood that the roller type can be readily adapted to this application although that adaptation is not specifically described herein.

The selection of separate curtain valves 14a for each of the six port openings conducting the outlet of air and steam to ducts 37 and 39, instead of the single movable curtain type described above, is because the ducts 37 and 39 are on the downstream sides of the port openings whereas the curtain type valve must be on the upstream sides of the ports and grid bars. In the valve array as seen in FIGS. 15 and 16, each of these six outlet ports face isolated compartments of the housing on the upstream side and a continuous curtain would have to pass through the walls of these compartments, requiring slots through the top and bottom walls. This is possible, and some sort of seals can of course be provided at the slots to minimize leakage therethrough, but I prefer to use separate curtains entirely contained within the compartment and avoid slots between compartments.

Figure 18:
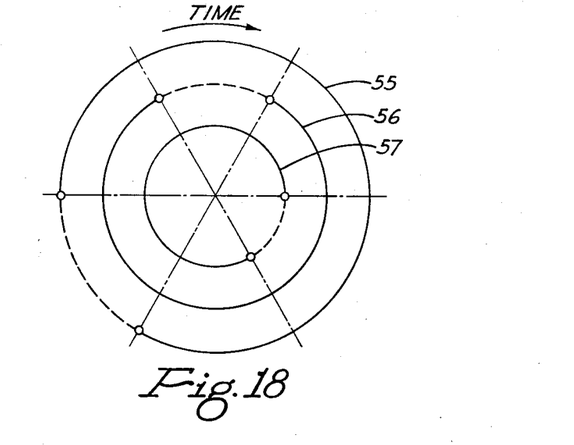
FIG. 18 is a schematic diagram of the program for opening and closing the valves.
Figure 19:
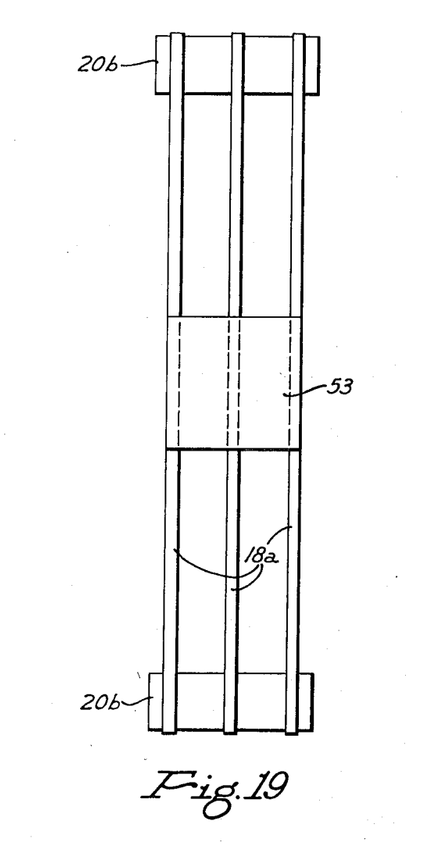
FIG. 19 is a view of the curtain-and-reel construction in one of the four ducts with the reels unrolled sufficiently to show the curtain area.
Figure 20:
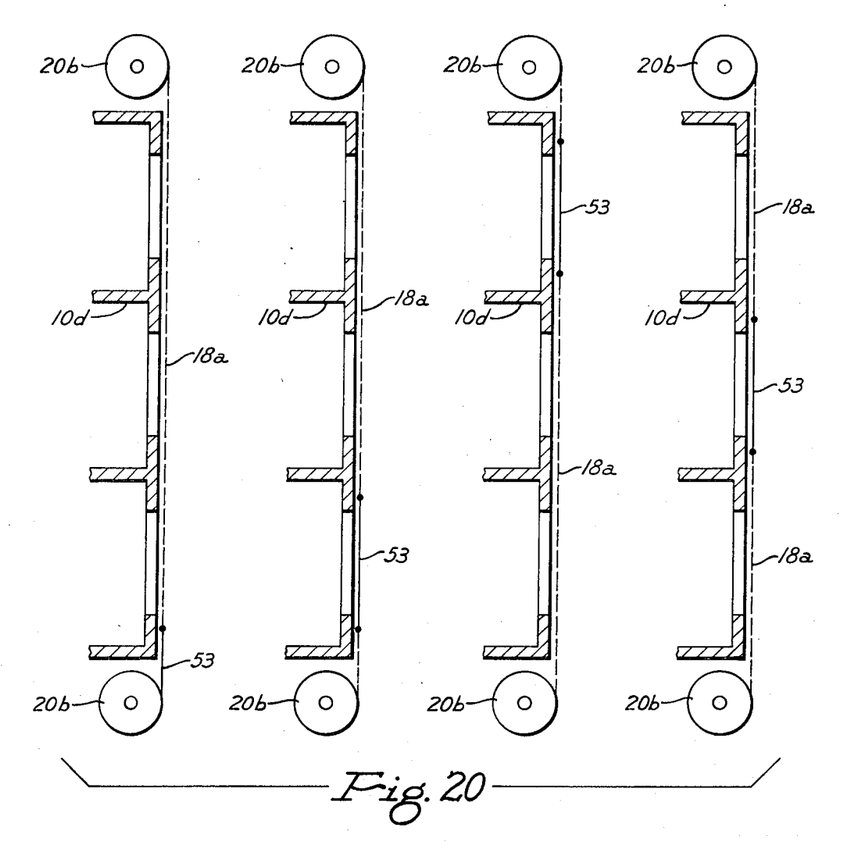
FIG. 20 is a diagram of the curtain-and-reel device of FIG. 19 with the curtain in four different positions.

The operation of the reels to move the curtains in the housing 10d, for the desired fluid flow through the adsorbers 36a, 36b and 36c in a predetermined sequence, would follow the timing generally indicated in FIG. 18. In this figure the cycle for each adsorber is indicated by a circle, the solid line portion of which represents the time that the adsorber is on stream (air passing therethrough via ducts 37 and 38), and the dash line portion of which represents the time the adsorber is being regenerated (steam passing therethrough via ducts 39 and 40). The outside circle 55 shows the cycle for adsorber 36a; the middle circle 56 shows the cycle for adsorber 36b, and the inside circle 57 shows the cycle for adsorber 36c. The actual time depends, of course, on the amount of adsorbent in each adsorber, the rate of air and steam flow therethrough, and the amount of the component in the air stream to be adsorbed. FIG. 18 illustrates the cycles where the regeneration time, indicated by the dotted line portion of the circles, is from 1/6 to 1/4 of the adsorption time, a range generally typical of commercial practice. The cycles for the three adsorbers are shown programmed in FIG. 18 in a phased relation such that the adsorbers are regenerated separately one after the other, at approximately equally spaced time intervals, all three adsorbers being on stream approximately half the time, and two adsorbers being on stream approximately the other half of the time. The control instrumentation for operating the motors driving the valve curtain reels according to this program illustrated in FIG. 18 is not shown or described in this disclosure, such instrumentation being well known to control engineers, but it is evident from the foregoing description of the 12-valve array that the construction lends itself to automatic, programmed control in predetermined sequence such as illustrated in FIG. 18.

The material selected for the impervious flexible sheet curtains herein disclosed may be any material suitable for the particular intended application. For the 12-port array controlling three adsorbers, a tough plastic made to withstand temperatures such as that of low pressure steam, such as sold under the trademark "MYLAR," may be used. For relatively high temperatures, as a valve of the type of FIGS. 5 and 6 applied to handle furnace gases, the curtain may be stainless steel. Where the fluid temperature is relatively low, an impregnated cloth curtain such as rubberized duck may be used. The curtain material is not, of course, limited to the above three examples.

It is apparent that all the embodiments illustrated and described herein are compact in space while providing ports of relatively large area, suitable for large volumetric fluid flow; that the closures are self-sealing under the differential of fluid pressure upstream and downstream of the valve opening; that the construction lends itself to a wide variety of types of valves and arrangements of arrays of ports in a single valve housing, and that wear of the valve components is minimized if not eliminated, there being no rigid sliding parts. My valve thus has great advantages over conventional valves having rigid solid closures as applied to large area ports.

My invention, broadly, is not limited to any of the specific embodiments disclosed above and may be practiced in any embodiment within the scope of the following claims.

I claim:

1. In a valve of the type having a gridwork flush on one side with the upstream face of the valve port opening, an impervious flexible sheet of area greater than said port opening one edge of which is secured to one end of said opening adjacent said gridwork on the upstream side, and a roller on the side of said sheet opposite said grid, the other end of said sheet being attached to said roller to wind and unwind thereabout as said roller traverses said grid, the improvement characterized by tapes extending between said gridwork and said impervious flexible sheet and thence 180° around said roller, the ends of the tapes between said sheet and said gridwork being attached to said port opening adjacent the edge of said sheet attached thereto, the opposite ends of said tapes extending 180° around said roller being attached to wind-up reels whereby operation of said wind-up reels effects traverse of said roller across said opening and the wrapping and unwrapping of said sheet about said roller to uncover and cover said opening.

2. A valve as set forth in claim 1 further characterized by the upstream face of said opening being at an angle to the horizontal, said sheet and said tapes being secured at the upper end of said face and said wind-up reels being mounted adjacent said upper end.

3. A valve as set forth in claim 2 in which said upstream face is substantially vertical.

* * * * *